US005598311A

United States Patent [19]

Yang

[11] Patent Number: 5,598,311

[45] Date of Patent: Jan. 28, 1997

[54] D.C. BREAKER ARC EXTINGUISHING CIRCUIT

[76] Inventor: Tai-Her Yang, No. 32 Lane 29, Taipin St., Si-Hu Town Dzan-Hwa, Taiwan

[21] Appl. No.: 639,894

[22] Filed: Apr. 26, 1996

Related U.S. Application Data

[63] Continuation of Ser. No. 192,619, Feb. 7, 1994, abandoned.

[51] Int. Cl.$^6$ .................. H02H 3/00

[52] U.S. Cl. .................. 361/9; 361/13

[58] Field of Search .................. 361/2, 8, 9, 13, 361/3, 10

[56] References Cited

U.S. PATENT DOCUMENTS 3,739,192 6/1973 Oswald .................. 307/136

4,623,948 11/1986 Volut .................. 361/13

5,339,210 8/1994 Howell .................. 361/9

*Primary Examiner*—Todd E. DeBoer

*Attorney, Agent, or Firm*—Bacon & Thomas

[57] ABSTRACT

A circuit for preventing ionization of air between contact points of a DC breaker switch when the breaker switch is opened includes a capacitor connected through a diode to form a shunt between the contact points when the switch is breaker switch is opened. A second switch is operated following shunting of residual voltage on the contact points so as to discharge the capacitor.

5 Claims, 1 Drawing Sheet

D.C. BREAKER ARC EXTINGUISHING CIRCUIT

This application is a continuation of application Ser. No. 08/192,619, filed Feb. 7, 1994, now abandoned.

SUMMARY OF THE INVENTION

When the switch between the D.C. power source and the load side of an extinguishing arc circuit is cut off, its residual will cause great damage to the life of the switch contact because the air between contact points is ionized. This invention uses a capacitor which is connected with the main switch to serve as a transient shunt so as to solve this problem when the main switch is cut off.

DETAILED DESCRIPTION OF THE PREFERRED EMBODIMENTS

Figure 1:
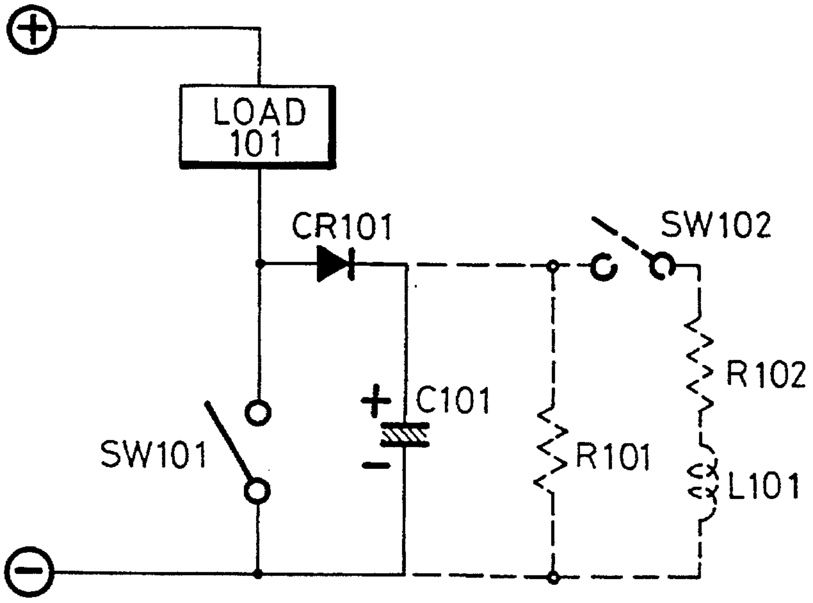
FIG. 1 is a schematic view of a first preferred embodiment of a D.C. cut-off extinguishing arc circuit.

FIG. 1 is a schematic view of a first preferred embodiment of a breaker arc suppression circuit. The circuit includes a D.C. power source, a switch element, a capacitor, a zener diode, and an auxiliary discharge circuit element, arranged as follows:

The D.C. power source may be either a pure direct current source or a pulse direct current source;

load 101 may include all kinds of loads or motors of resistive, electroinductive, or combined type;

electromechanical switch element SWI01 is connected in series with the load and then in parallel with the D.C. power source;

a zener diode CR101 is connected in series with capacitor C101 according to the order of D.C. power source polarity and then is parallel connected with the two ends of the electromechanical switch element SW101;

flow resistance R101 may be directly series connected with the capacitor C101, or series connected with the flow resistance R102 to the control switch SW102 and then parallel connected between the two ends of capacitor C101 for capacitor to discharge at a proper time, the flow resistance R102 including a common series connection with the electric resisting load and a flow load;

The preferred embodiment uses the capacitor to absorb current to reduce the transient residual arc at the time of cutting off the switch, and then to discharge the electric charge of the capacitor storage to prepare for extinguishing the arc when the main switch is cut off for a second time.

Figure 2:
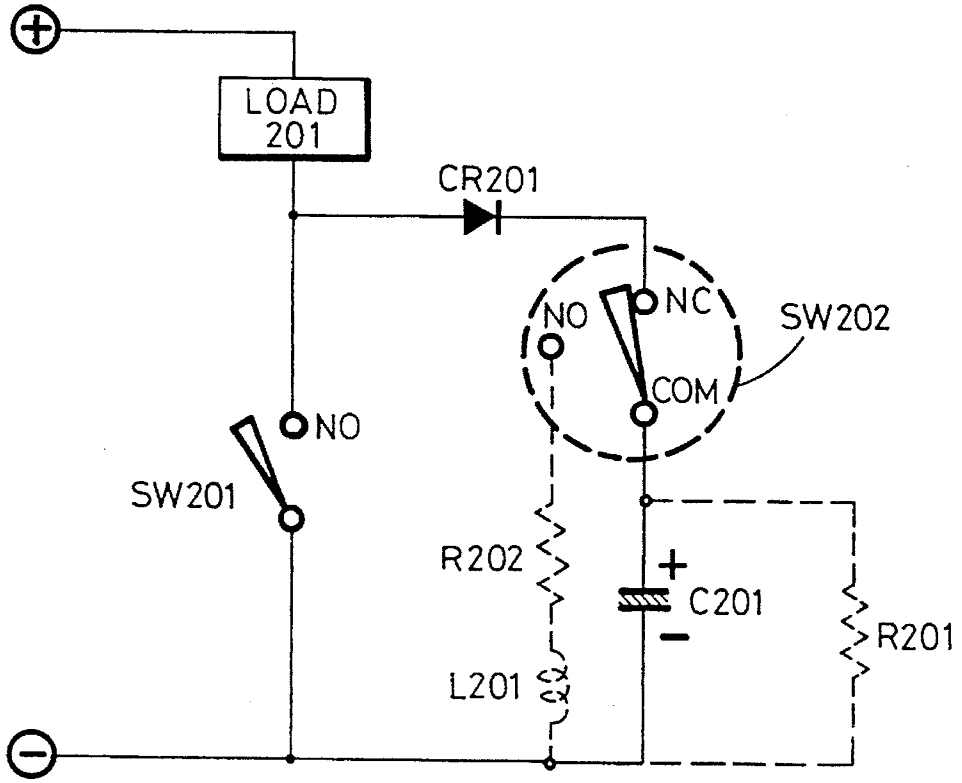
FIG. 2 is a schematic view of a second preferred embodiment of D.C. breaker arc extinguishing circuit in which a double switch is further cut off in order.

FIG. 2 is a schematic view of a preferred embodiment of a D.C. cut-off arc extinguishing circuit in which a double switch is cut off in order. This embodiment of the invention consists of:

a D.C. power source, which may be a pure or pulse direct current course;

a load 201 which can include all kinds of loads or motors of resistive, electroinductive, or combined type;

an electromechanical switch element SW201 provided in series with the load and then connected in parallel with the D.C. power source;

a zener diode CR201 is in series with capacitor C201 according to the order of D.C. power source polarity and then in parallel with the two ends of the switch element SW101;

a flow resistance R201 directly series connected with the capacitor C201, or in series from the flow resistance R202 to the control-switch SW202 and then in parallel with the two ends of capacitor C201 for the capacitor to discharge at a proper time, the flow resistance R202 including a common series connection with the electric resisting load L201 for a flow resistance; and a zener diode CR201 connected in a series together with the capacitor C201 through the closed contact NC and the common contact COM of flow switch SW202 and then in parallel with the two ends of the SW201; flow resistance R202 (which may be further series connected with the electroinductive resistance L201) being connected with the earth end of the capacitor and with the open contact NO so as to discharge the residual power energy of the capacitor when the switch is turned to open contact NO and common contact COM.

The time for starting the electromechanic switch SW201 is before the dependent contact CON is switched from close contact NC of the flow switch SW202 to open contact NO, capacitor C201 being connected to reduce the arcing phenomenon when the electromechanic switch SW201 is cut off. In practice, the D.C. breaker arc extinguishing circuit can be structured as series or parallel multiple units.

By means of the embodiments illustrated in FIG. 1 and FIG. 2, the reader can apply the contact points to a single or a multiple breaker unit, including series and parallel breakers, as well as magnetic switches, manual switches, or over-load cut-off breakers.

In conclusion, the present invention provides a capacitor which is connected with a main switch to serve as a transient shunt so as to reduce the residual arcing when the main switch is cut off.

I claim:

1. A direct current (DC) cut-off switch arc extinguishing circuit, comprising:

a DC power source having two terminals;

a cut-off switch and a load connected in series between the two terminals of the power supply, said cut-off switch having first and second contacts; and shunt circuit means including a diode and capacitor connected in series between the first and second contacts of the cut-off switch to shunt residual voltage present on the contacts in order to charge the capacitor following opening of the cut-off switch and thereby extinguish any arc present when the cut-off switch is opened; and capacitor discharge means for discharging the capacitor to prepare for extinguishing the arc when the cut-off switch is cut off for a second time, wherein said capacitor discharge means for discharging the capacitor to prepare for extinguishing the arc when the cut-off switch is cut off for a second time includes a second switch arranged to connect the capacitor to a capacitor discharge resistor following charging of the capacitor in order to discharge the capacitor through the capacitor discharge resistor.

2. A circuit as claimed in claim 1, wherein said second switch has a common contact connected to one end of the capacitor, a second contact connected to one end of the diode, and a third contact connected to said capacitor discharge resistor.

3. A circuit as claimed in claim 2, further comprising an inductive load connected in series with said capacitor discharge resistor.

4. A circuit as claimed in claim 1, wherein said second switch is connected between said capacitor and said capacitor discharge resistor.

5. A circuit as claimed in claim 1, where said cut-off switch is a switch selected from the group consisting of single unit breakers, multiple unit breakers, magnetic switches, manual switches, and over-load cut-off breakers.

* * * * *